Jan 6, 1931.  C. G. OLSON  1,787,590
HOB
Filed April 21, 1928  3 Sheets-Sheet 1
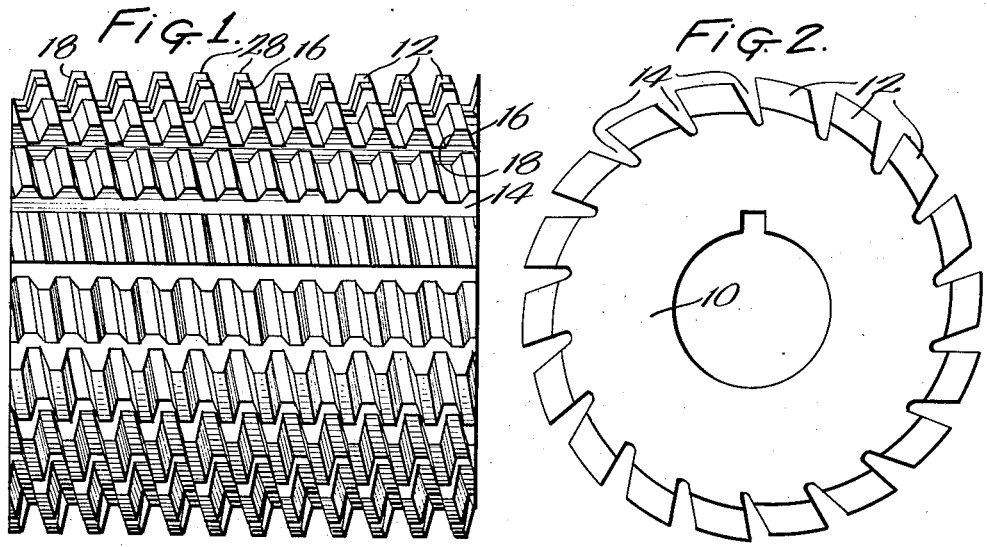
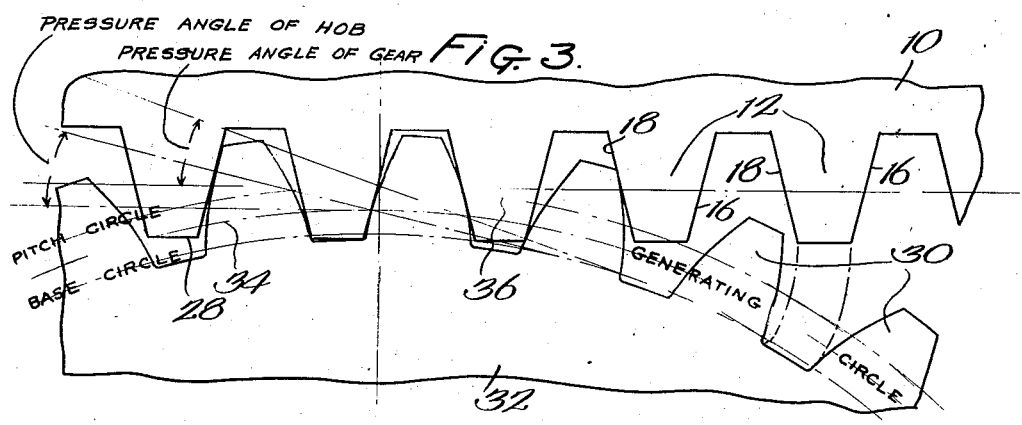
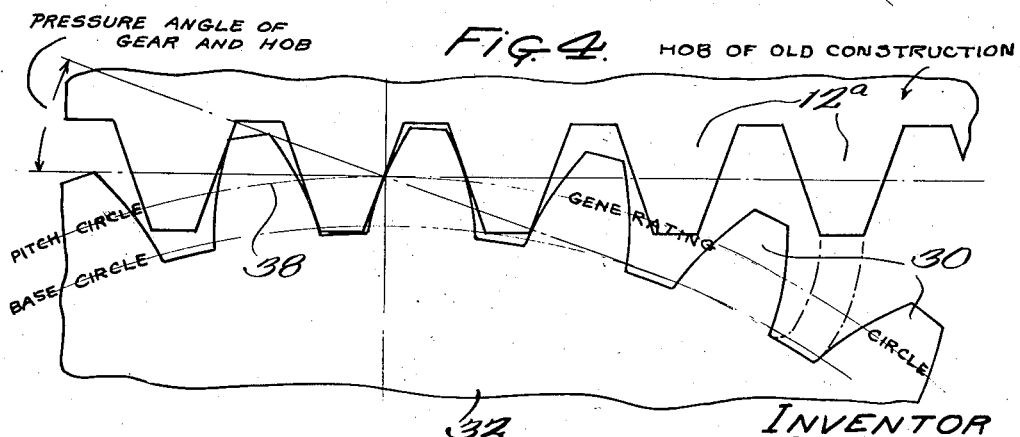
INVENTOR
CARL G. OLSON
By Cheever & Cox ATTY'S Jan 6, 1931.  C. G. OLSON  1,787,590
HOB
Filed April 21, 1928  3 Sheets-Sheet 2
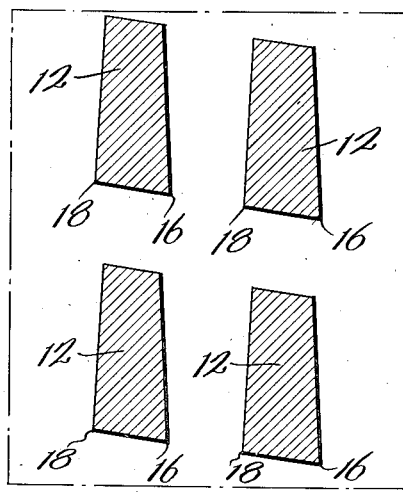
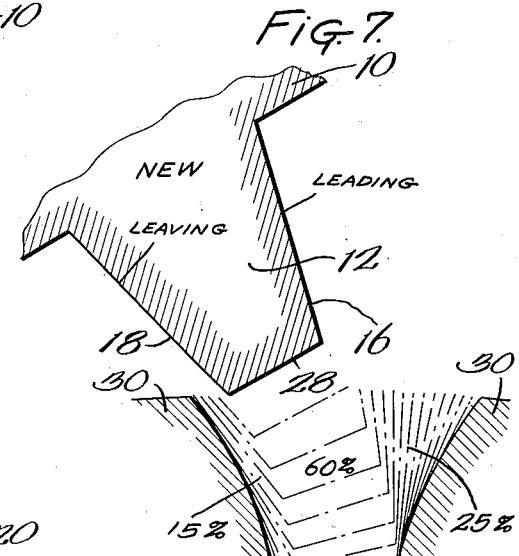
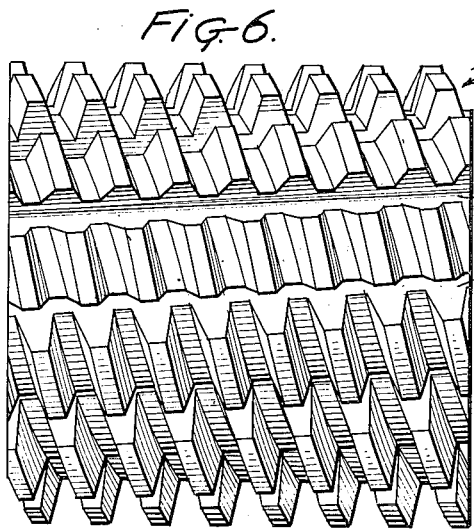
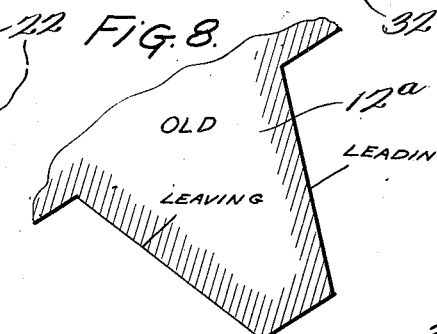
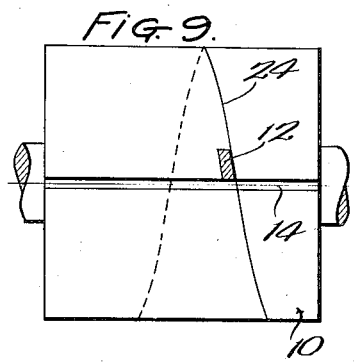
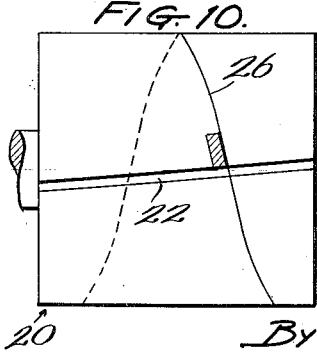
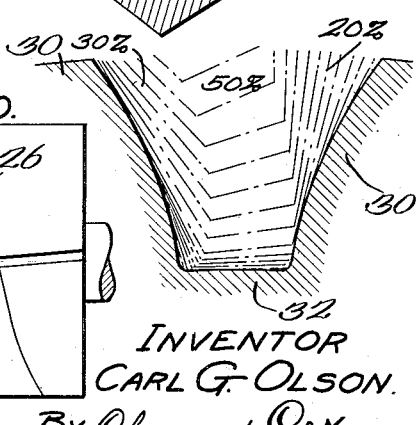
INVENTOR
CARL G. OLSON.
By Cheever + Cox
ATTY'S.

Jan 6, 1931.    C. G. OLSON    1,787,590
HOB
Filed April 21, 1928    3 Sheets-Sheet 3

INVENTOR
CARL G. OLSON
By Cheever & Cox
ATTYS.

Patented Jan. 6, 1931

1,787,590

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

HOB

Application filed April 21, 1928. Serial No. 271,693.

My invention relates to hobs for cutting spur gears and the like and simulates the invention described in my co-pending application, Serial No. 178,248, filed March 25, 1927, and the primary object of my present invention is to provide a hob by means of which the speed with which gears may be cut will be greatly accelerated.

As set forth in my above mentioned co-pending application, I have found that hobs may be made to cut more efficiently when the sharpness of one of the cutting edges thereof is increased, even though this increase is made at the expense of one of the other cutting edges of the hob teeth. I have also described how the sharpness of a cutting edge of the hob may be increased by running the flutes or gashes obliquely to and with the same hand lead as the thread of the hob, and also that by increasing the steepness of the sides of the hob tooth, the greater will be the amount of metal removed by the leading side of the teeth and the less will be removed by the leaving side thereof.

My present invention contemplates increasing the sharpness of the leading cutting edge of the hob teeth, as set forth in the above mentioned co-pending application and in addition contemplates the use of multiple threads in the hob in order to permit the use of straight flutes or gashes or helical gashes having a lead which is opposite to the thread of the hob. By employing multiple threads or starts, the helix angle of the hob is much greater than in a single thread or start hob and the thread angle is increased to such an extent that a leading edge having the required degree of sharpness can be produced without the necessity of forming helical gashes which have the same hand lead as the thread of the hob. If the thread angle is great enough, it might in some instances be advisable to employ a spiral gash of the opposite hand lead instead of the straight gash as already suggested.

In addition to the above mentioned characteristics, it is an object of my invention to not only increase the sharpness of the leading cutting edge of the hob teeth, but also the top cutting edge thereof and to this end I propose to undercut the hob teeth to effect a shearing action of said top cutting edge and it is this shearing action which greatly facilitates the ease with which hob teeth cut through the gear blank.

An object of my invention is also to provide a hob of the instant nature having certain cutting edges of the teeth sharpened, or in other words rendered more acute, and in addition thereto I propose to form the outer ends of the hob teeth so that said teeth will undercut the roots of the teeth formed in the gear blank. Thus, a hob constructed in accordance with the teachings of my invention and formed with protuberances at the outermost portions of the teeth may be employed for roughing out gear teeth and at the same time undercutting the teeth at the roots thereof to thereby facilitate the subsequent grinding, burnishing, shaving, lapping and like operations for finishing the hob. By undercutting the teeth in this manner stock is removed from the portion of the gear tooth profiles which falls below the working curve to thereby minimize the work of the tools employed in the above mentioned finishing process and to save the cutting portion of said tools.

The above mentioned and other objects will be more apparent from the following detailed description when considered in connection with the accompanying drawings wherein:

Figure 1 is a side elevational view of a hob formed in accordance with the teachings of my invention, said hob having a short lead and provided with five threads and straight gashes or flutes;

Figure 2 is an end elevational view of the hob as viewed from the right of Figure 1;

Figure 3 is a diagram on an increased scale disclosing an outline of teeth of the gear and teeth of the hob embodying my invention;

Figure 4 is a diagrammatic illustration analogous to Figure 3 showing the same gear teeth but in cooperative relation with the teeth of a hob of an old construction;

Figure 5 is a sectional view indicating the appearance of the teeth if cut by a cylinder coaxial with the hob and passing through the teeth at some point between the top and the bottom thereof.

Figure 6 is a side elevational view of a multiple thread hob embodying features of my invention, said hob having a greater thread angle than the hob disclosed in Figure 1 and provided with spiral gashes having a lead opposite to that of the hob threads;

Figure 7 is a diagram showing an outline or profile of a tooth of my improved hob on an increased scale indicating the manner in which the hob acts in cutting the gear blank;

Figure 8 is a view similar to Figure 5, except that it shows the action of an ordinary type of hob in cutting a gear blank;

Figure 9 is a diagrammatic view of a hob blank, said blank being formed with a straight gash and a sectional view of one of the hob teeth being shown to clearly illustrate the increase in the sharpness of the cutting edge of the hob tooth when the thread angle of the hob is increased or, in other words, when the hob is formed with multiple threads or starts as shown in Figure 1;

Figure 10 is a diagrammatic view similar to Figure 9 which serves to indicate that a spiral gash having a lead opposite to the lead of the hob may be employed when the thread angle of the hob is increased still further;

Figure 11:
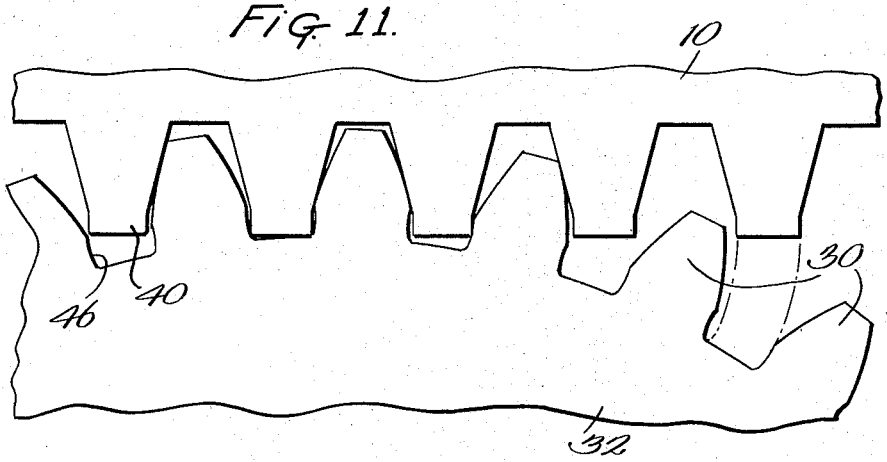
Figure 12:
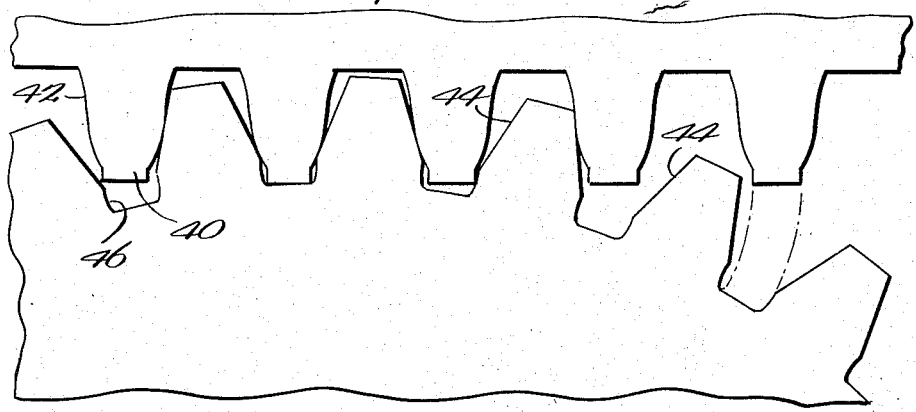

Figure 11 is a diagram on an increased scale similar to the diagram shown in Figures 3 and 4 showing an outline of the teeth of a gear and a hob formed with protuberances for undercutting the teeth of the gear blank; and Figure 12 is a view similar to Figure 11 disclosing a hob formed with protuberances for undercutting the gear teeth, and having the sides thereof designed to produce straight sided teeth in the blank.

At this point it might be advisable to explain some of the differences between a hob having a standard lead and a hob having a relatively long or short lead. A hob is said to have a standard lead when the normal spacing of the thread is equal to the circular pitch of the gear to be cut. This requires that the angular disposition of the sides of the thread be equal to the pressure angle of the teeth of the gears to be cut when said gears are of standard pitch diameters. A short lead hob however, is one which is said to have a short lead when the normal spacing of the thread is less than the circular pitch of the gear to be cut and when the angular disposition of the sides of the thread are less than the actual pressure angle of the gear to be cut so as to compensate for the short lead of said thread. A hob having a long lead is one in which the lead is said to be long when the normal spacing of the thread is greater than the circular pitch in the gear to be cut and when the angle of the side of the thread is greater than the pressure angle of the gear to be cut so as to compensate for the long lead. The present invention relates to a hob of the short lead type in which the normal spacing of the thread is less than the circular pitch of the gear to be cut and hence the thread angle is less than the pressure angle of the gear to be cut. As will hereinafter appear, a hob of my improved design is generated upon a circle of less diameter than the diameter of the pitch circle of the gear to be cut.

In a gear cutting hob the oppositely disposed cutting edges of each tooth may be referred to as leading or leaving sides whatever the case may be. The leading cutting edge of a hob tooth is the side edge which is followed by one side of a gear tooth in the process of generating said tooth. The leaving cutting edge of the hob tooth is the side edge which follows one side of the gear tooth in the process of generating. If the above facts are borne in mind, it is believed that the following description of my improved hob will be more readily appreciated.

Referring now to the drawings wherein like numerals have been employed to designate similar parts throughout the various figures, it will be observed that in Figures 1 and 2 I have disclosed a hob which is formed with a body 10 and a plurality of peripheral teeth 12 arranged helically in accordance with the molding generating principle of forming hobs. In Figure 1 I have shown a multiple thread hob, said hob being formed with five threads or starts which have a right-hand lead and a plurality of straight gashes 14 extending transversely of the thread helix in parallelism with the hob axis. The helix angle of this hob is obviously much greater than the helix angle of a single thread or start hob and in this connection it is to be understood that the thread angle is increased to such an extent that the leading edge 16 of each of the hob teeth is greatly sharpened. In fact, by running the gashes 14 in parallelism with the hob axis the leading edges 16 of the teeth are sharpened to such an extent that the operating efficiency of the hub is greatly increased, even though the sharpness of the leaving edges 18 of the hob is decreased.

In Figure 6 I have disclosed a hob, indicated generally by the numeral 20, having a thread angle which is greater than the thread angle of the hob in Figure 1 just described. In other words the hob disclosed in Figure 6 is provided with more threads or starts than the hob in Figure 1 and hence the lead thereof is correspondingly increased. By increasing the thread angle to such an extent, I am able to provide the hob 20 with spiral or helical gashes 22, the lead of which is opposite to the lead of the threads. Even though I have formed spiral gashes in said hob in the direction opposite to the thread helix, I am still able to increase the leading cutting edge of the hob teeth so as to increase the operating efficiency thereof similar to the manner in which I am able to increase the operating efficiency of the hob shown in Figure 1 by using the straight gashes 14. The foregoing will be more apparent when reference is made to the diagrammatic representations shown in Figures 9 and 10. Figure 9, for example, discloses in rectangular outline the hob blank of Figure 1 and for purposes of clearness is shown with one of the straight gashes 14 formed therein and one of the teeth 12 shown in cross section. A helix 24 is shown to indicate the helical arrangement of the teeth and also the increase in the helix angle as compared with a single thread or start hob. For purposes of illustration, I have indicated the helix angle as being 85 degrees, and it will be apparent that by having this helix or thread angle I am able to form the teeth 12 acutely so as to increase the sharpness of the leading cutting edge 16 thereof and also to form said teeth obtusely and thereby decrease the sharpness of the leaving cutting edge 18. By referring to Figure 10 which is similar to Figure 9, it will be seen that the helix line 26 discloses the helical arrangement of the teeth in the hob 20, the thread or helix angle being increased in Figure 10. Although the gash 20 is spirally formed in a direction opposite to the threads of the hob 20, I am able to maintain the acuteness of the leading cutting portion or edge of the hob teeth, namely 85 degrees. In order to increase the sharpness of the top cutting edge 28 of the hob teeth, I undercut the gashes or flutes as clearly shown in Figure 2 and by having the hob teeth formed as described, said teeth will exert a shearing action upon a gear blank and it is this shearing action which greatly facilitates the ease with which the hob teeth cut through the metal.

Referring now to Figure 3 wherein I have disclosed in a diagram on an increased scale the outline of teeth 30 of a gear blank 32 and the outline of the teeth 12 of the hob disclosed in Figures 1 and 2, it will be understood that said hob is a short lead hob. This will be clear when it is understood that said hob generates upon a line 34 which is below the pitch circle 36 of the gear blank 32. In other words, the pressure angle of the hob as shown in Figure 3 is less than the pressure angle of the gear when said pressure angle is considered with respect to the pitch circle of said gear. It might also be stated that the hob has a pressure angle which is the same as that of the teeth in the gear blank when said pressure angle is considered relative to a generating circle, namely the circle 34, which is of smaller diameter than the pitch circle of the gear blank.

Refering to Figure 4, wherein I have disclosed in diagrammatical outline a hob of usual or ordinary design having teeth 12 shown in association with the teeth 30 of the gear blank 32, it will be observed that the lead of an ordinary multiple thread hob is greater than the lead of my improved hob. In other words the hob shown in Figure 4 generates on a line 38 which represents the pitch circle of the gear 32 as distinguished from the hob shown in Figure 3 which generates on the circle 34 which has a radius less than the pitch circle of the gear. In other words my improved hob has a lead which is shorter than the lead of ordinary hobs and yet is able to produce gear teeth of the required shape. In the ordinary hob the normal lead thereof is equivalent to the circular pitch in the gear to be cut multiplied by the number of starts or threads in the hob and this is to be distinguished from the hob of my improved design which has a normal lead which is shorter than the circular pitch in the gear to be cut multiplied by the number of starts in the hob. If the gear 32 as shown in Figure 3 is considered as a long addenda gear having a circular pitch which is equal to the normal pitch equivalent of the hob, said hob may be said to have a normal lead which is equal to the circular pitch of a long addenda gear of the same pitch multiplied by the number of starts or threads in the hob. By employing the well known formula, $$\text{Lead} = \frac{CP \times N}{\cos. a},$$

wherein CP represents the circular pitch of the gear to be cut and N the number of starts or threads of the multiple threaded hob, and (a) represents the helix or thread angle of the hob, it will be observed that the hob which I have shown in Figures 1 to 3 inclusive has an axial lead which is shorter than the circular pitch of the gear to be cut multiplied by the number of starts or threads in the hob, divided by the cosine of the thread angle.

Refering to Figures 7 and 8, it will be seen that I have disclosed the action of a hob formed in accordance with the teachings of my invention as well as the old or ordinary hob, in removing stock from a gear blank. Thus in Figure 8 it will be seen that by use of the ordinary type of hob wherein the sharpness of the leading cutting edges of the hob teeth has not been increased, a larger percentage of the stock is removed by the leaving cutting edge of the hob teeth as compared with the stock removed by the leading edge. In other words, 20% of the stock is removed by the leading cutting edge, 30% by the leaving cutting edge, and 50% by the top cutting edge. This is to be compared with and distinguished from the action of the teeth 12 of my improved hob whereby a greater percentage of the stock is removed by the leading cutting edge and a less percentage by the leaving cutting edge. In this connection, it is to be understood that the specific percentages which I have set forth are merely used for purposes of illustrating the advantages resulting from the use of my improved hob and are not offered as mathematically accurate.

In Figures 11 and 12 I have disclosed hobs which are formed in accordance with the aforementioned description with respect to the increasing of the sharpness of the leading cutting edge of the hob and in addition thereto are provided with protuberances 40 at the top of the hob teeth. These protuberances serve to undercut the teeth in the gear blank as clearly shown in Figures 11 and 12, the design of the hob teeth shown in Figure 11 being such as to form ordinary involutes in the gear blank while the teeth of the hob shown in Figure 12 are formed with curved sides 42 which are adapted to form teeth in the gear blank having straight sides 44. Undercut portions 46 of the gear tooth profiles fall below the working curve of the gear and it is to be understood that by having these undercut portions 46, subsequent finishing operations upon the gear are greatly facilitated. Thus the hob may very effectively be employed for roughing operations and by having these undercut portions 46, the subsequent grinding or burnishing of the teeth may be done with greater ease because the working periphery of the grinding wheel or tool need not be moved into engagement with the root of the teeth and thereby the cutting surface of said wheel or tool is saved. In other words the type of roughing hob just described lends itself for roughing gear teeth preparatory to finishing by grinding, shaving and the like, because it produces a rough cut in the gear in such a manner that the finishing process is made less difficult than if the preliminary roughing work was done by the conventional roughing hob.

From the foregoing it is to be understood that my invention provides a multiple thread hob for cutting spur gears and the like which is far superior in functional characteristics to the ordinary types of multiple thread hobs. Obviously as the number of threads of a multiple thread hob of ordinary design is increased, the labor on a hobbing machine with which it is used is correspondingly increased, although the multiple thread hob works faster than the single thread hob. The use of three threads has been considered the practical limit because of the excess labor to which a hobbing machine is subjected as the number of threads in the hob is increased. By producing a multiple thread short lead hob in accordance with the aforementioned description, having an acute cutting edge so arranged that the bulk of material is removed thereby, it becomes practical to construct spur gear hobs with a greater number of threaded helices or starts than have heretofore been employed and it also becomes practical to use hobs of larger diameter with a greater number of flutes. In other words the greater ease of cutting introduced by my improved device has raised the limit of production factors very materially. Another advantageous feature of my invention resides in the fact that I am able to produce an efficiently operable straight gashed multiple threaded hob. By having the straight gashes or flutes, the maintenance of the hob, which consists in the proper repeated sharpening thereof, becomes a very simple problem as distinguished from the hobs wherein spiral gashes are employed. My invention also enables the increase in production of gear blanks without the necessity of increasing the power required to drive the hobbing machine and hence represents a decided advance from the standpoint of accelerated production and efficiency of operation over devices heretofore employed in the cutting of gears. As hereinbefore suggested, my invention is not limited to the use of multiple threaded hobs having straight gashes, but contemplates the use of helical gashes having a lead which is opposite to the lead of the thread of the hob, in instances where the thread angle is sufficiently great.

Having thus described my invention, what I claim as new and desire to secure by Letters Patent is:

1. A hob having approximately straight gashes, the teeth of said hob having straight sides when viewed in profile upon a plane passing approximately diametrically through the hob, the teeth being narrower at the bottom and wider at the top than in a hob in which the sides of the teeth conform to the pressure angle of the teeth of the gear to be cut, the hob teeth being undercut to thereby produce an acute angle at the top of the cutting edge of the teeth.

2. A multiple thread hob having gashes extending transversely of the thread of the hob so as to increase the sharpness of the cutting edge at the leading side of the hob teeth, said sharpness being produced by having the gashes of a lead differing in hand from the lead of the hob thread, the hob teeth having a pressure angle which is less than the pressure angle of the gear to be cut.

3. A multiple thread hob having gashes extending transversely of the thread of the hob so as to increase the sharpness of the cutting edge at the leading side of the hob teeth, said sharpness being produced by having the gashes of a lead differing in hand from the lead of the hob thread, the hob teeth having a pressure angle which is less than the pressure angle of the gear to be cut, the hob teeth being undercut to thereby produce an acute cutting angle at the top cutting edge of the hob teeth.

4. A multiple thread hob for cutting involute gears, substantially straight gashes extending transversely of the thread of the hob, the sides of the hob teeth having a slope of such a steepness as to cause them to generate on a circle of smaller diameter than the diametrical pitch circle of the gear to be cut.

5. A multiple thread hob for cutting involute gears, substantially straight gashes extending transversely of the thread of the hob, the sides of the hob teeth having a slope of such steepness as to cause them to generate on a circle of smaller diameter than the diametrical pitch circle of the gear to be cut, the front faces of the teeth being undercut.

6. A multiple thread hob having gashes extending transversely of the threads of the hob so as to increase the sharpness of the cutting edge at the leading side of the hob teeth, said gashes having a lead differing in hand from the lead of the hob thread, said hob having a normal lead shorter than the circular pitch in the gear to be cut multiplied by the number of starts in the hob.

7. A multiple thread hob having gashes extending transversely of the threads of the hob so as to increase the sharpness of the cutting edge at the leading side of the hob teeth, said gashes having a lead differing in hand from the lead of the hob thread, said hob having a normal lead shorter than the circular pitch in the gear to be cut multiplied by the number of starts in the hob, the teeth of said hob being undercut to increase the sharpness of the cutting edge at the top of each of said teeth.

8. A gear cutting hob which is adapted to generate on a circle of smaller diameter than the pitch circle of the gear to be cut, one of the cutting edges of each of the teeth in said hob being formed acutely and the outer end of the teeth having a protuberance for undercutting the teeth in a gear blank.

9. A short lead gear cutting hob having gashes extending transversely of the hob threads so as to increase the sharpness of the leading cutting edge of each of the hob teeth, the outer portions of the hob teeth having a widened portion.

10. A gear cutting hob which is adapted to generate on a circle of smaller diameter than the pitch circle of the gear to be cut, one of the cutting edges of each of the teeth in said hob being formed acutely and the outer portions of the teeth being formed to cut below the working surfaces of the teeth in a gear blank.

11. A hob which generates on a circle of smaller diameter than the pitch circle of the gear to be cut, having gashes extending transversely of the thread helix so as to increase the sharpness of one of the cutting edges of the hob teeth, said teeth being formed at their outer ends so as to undercut the teeth formed in a gear blank.

12. A gear cutting hob having helically arranged cutting teeth terminated in two acute cutting edges and one obtuse cutting edge, the thread helices being of a shorter lead than the ordinary hobs of the same pitch, and the outer portions of the hob teeth being formed so as to undercut the teeth formed in a gear blank.

13. In a gear cutting hob having helically arranged cutting teeth, the lead of said helix being shorter than the lead of a standard hob, thereby proportioning the hob teeth with short addenda and long dedenda, the addenda of the hob corresponding to the dedenda of the gear to be cut, and the dedenda of the hob corresponding to the addenda of said gear, the addenda of each of said hob teeth terminating with protuberant portions.

14. In a hob for generating involute gear teeth and the like having a helicoidal thread of a lead smaller than the circular pitch of the gear to be cut, the pitch line of the hob being tangent to a generating circle located inside of the pitch circle of the gear to be cut, said hob having gashes extending transversely of the threaded hob so as to increase the sharpness of the cutting edge of the leading side of the hob teeth, said gashes having a lead differing in hand from the lead of the hob thread.

15. A hob for generating involute gear teeth and the like having a helicoidal thread of a lead corresponding to a distance measured along a circle which is of less diameter than the pitch circle of the gear to be cut, said distance being taken between a pair of imaginary radial lines of the gear which intersect said circle, said imaginary lines passing through the pitch circle of the gear at points, the distance between which is equal to the circular pitch of the gear, said hob having gashes extending transversely of the thread of the hob so as to increase the sharpness of the cutting edge of the leading side of the hob teeth, said gashes having a lead differing in hand from the lead of the hob thread.

In witness whereof, I have hereunto subscribed my name.

CARL G. OLSON.